United States Patent Office 2,995,189
Patented Aug. 8, 1961

2,995,189
HYDRAULIC CEMENTS HAVING AN EXTENDED THICKENING TIME, METHODS OF MAKING THE SAME, AND PROCESSES EMPLOYING THE SAME
Howard G. Cutforth, Bartlesville, Okla., assignor to Phillips Petroleum Company, a corporation of Delaware
No Drawing. Continuation of application Ser. No. 294,674, June 20, 1952. This application Mar. 13, 1959, Ser. No. 799,078
45 Claims. (Cl. 166—31)

This invention relates to cements having retarded rates to hydration or set, to slurries of such cement, and to the method of making these slurries. The cement with which the invention is concerned is preferably a Portland or Portland-type cement. In another aspect it relates to any hydraulic cement composition in a dry form, or with added water in an aqueous slurry form, which when in the form of an aqueous slurry has a retarded initial set or extended or retarded thickening time and/or a reduced water-loss to adjacent porous formations, due to the addition of a minor but effective amount of an additive consisting of from 25 percent to 75 percent by weight of cellulose sulfate selected from the group consisting of acid cellulose sulfate and its salts, the remainder being selected from the group consisting of acid carboxymethyl hydroxyethyl cellulose mixed ether and its salts, this invention relating first to said compositions of matter, second to processes of compounding said compositions, and third to processes for using said compositions in the arts of cementing wells, sealing porous formations during the drilling of wells, cementing casings in the well, squeeze cementing, plugging the well or the earth formation adjacent the same, and grouting or sealing crevices, cracks or holes in man-made formations, such as buildings, foundations, dams, breakwaters or concrete and masonry structures, in some instances the cracks or fractures already existing before the slurry is pumped into them, and in some cases the pressure of the slurry being pumped into or against the surface of said formation or structure forming by its pressure the cracks or fractures to be filled. In another aspect it relates to obtaining substantially as great, and as important, reduction in water-loss and increase in thickening time of the cement, when employing as said additive acid carboxymethyl hydroxyethyl cellulose mixed ether and its salts only, or with the remaining zero to 25 percent of said additive being cellulose sulfate, as will be obvious from Table I in column 8 comparing the improvement in both these qualities in runs 4 and 9 using carboxymethyl hydroxyethyl cellulose mixed ether only over the blank run 1, as compared to the results obtained with mixtures in runs 2, 3 and 5–8.

This application is a copending continuation of my application Serial No. 294,674 filed June 20, 1952, which was expressly abandoned on March 13, 1959, after the present application was filed.

Among the objects of the invention is the provision of a cement having a retarded rate of hydration, or retarded set, as it will be hereinafter termed, particularly at elevated temperatures up to and above 300° F, and/or at high pressures up to and above 20,000 pounds per square inch, such as are encountered in cementing of deep wells.

One object of the present invention is to provide a suitable hydraulic cement aqueous slurry and suitable processes employing the same, for cementing casing in wells, for squeeze cementing in wells, and for grouting cracks, fractures or voids, in natural formations, such as in wells, or in man-made formations such as dams, breakwaters, walls and massive foundations and structures of all types.

Another object of this invention is to provide a dry hydraulic cement powder which is a novel composition of matter, and which may be mixed with water to form an aqueous cement slurry which is a novel composition of matter and which has at least one of the following useful properties: a relatively retarded time of initial set, a relatively extended thickening time during which it is pumpable, and/or a relatively low water-loss to porous formations with which it may come in contact during cementing or grouting operations.

Further objects of the invention reside in the provision of a slurry of the above cement, and in a method of making such slurry.

These and further objects of the invention will be more readily apparent in the following description.

In the cementing of oil wells it is customary to mix a hydraulic cement, for example a Portland or Portland-type cement, with the requisite amount of water to form a pumpable neat slurry, and to pump the mixture into the well and down the hole into the place where it is desired to have it harden. In present oil well drilling practice, with wells commonly ranging from 6,000 to 12,000 feet or more in depth, high temperatures are encountered at the locations which are to be cemented, and relatively long periods of time are often required to pump the slurry into place. Furthermore, in the customary practice of pumping the cement slurry down through the casing and either forcing it out the bottom of the casing and upward around the outer surface of the casing, or through perforations in the lower end of the casing into the formation sought to be sealed, the slurry is required to pass through narrow channels and small openings. Successful placement of the slurry, therefore, requires that the slurry shall remain fluid and pumpable at high temperatures for several hours before it begins to harden. However, after the slurry has been pumped into place, it is desirable to have the hydration or set proceed at a rate at which the slurry will attain its final set and develop considerable strength within a reasonable time, say within a few days.

As pointed out in the preceding paragraph, the most important function of the hydraulic cement aqueous slurry of the present invention is that it has a retarded time of initial set, and therefore remains pumpable for a relatively long period of time and a relatively long period of time passes before it thickens; yet it will attain a final set of some considerable strength within a reasonable length of time so that the well-drilling crew is not unduly delayed, but can get back to work and proceed to continue drilling the well bore, or to perforate the casing and/or cement with the usual gun perforating tools known to the art. All types of acid cellulose sulfate and all salts of all types of acid cellulose sulfate when combined as a mixture in the ratios of 1:3 to 3:1 with all types of acid carboxymethyl hydroxyethyl cellulose mixed ether, or all salts of all types of acid carboxymethyl cellulose mixed ether (this mixture for purposes of abbreviation hereinafter being called "said additive" when desired) have unexpectedly great set retarding and thickening time extending properties in the practice of the present invention; and when the acid cellulose sulfate, or salt of acid cellulose sulfate, is carefully prepared so that a relatively high degree of sulfate substitution has occurred with relatively low amounts of degradation of the cellulose molecules, a secondary effect is achieved with said additive which, while not as important as the first mentioned effect of delaying the time of initial set and extending the thickening time of the cement, is also of considerable value in cementing oil wells; namely, the aqueous cement slurry containing the minor but effective amount of said additive has a reduced tendency to lose water to porous formations across the surface of which it must pass in going to its intended position in the well. Many failures in prior art oil well cementing jobs, which have been accredited to the premature setting of the cement, are thought to be caused actually by the formation dehydrating the cement slurry, thereby rendering the cement immobile before it reaches the desired position. As the practice of using scrapers to clean the mud off the well walls to obtain a better cement-formation bond becomes more frequently used, the better the formations may absorb water from the cement slurry causing it not only to plug the annulus between the casing and the wall of the well, but also to have insufficient water for normal hydration upon setting, and the greater will become the realization of the need for low water-loss cements.

Everything which is said applying to natural formations in wells applies also in some degree to man-made formations being grouted, and the word "formation" as used herein is regarded as generic to natural earth formations, geological formations, and man-made formations such as structures.

In the prior art of squeeze cementing in wells and in forcing grout into the cracks and crevices in fractured foundations or the like, it has been the practice to employ as a breakdown agent water or drilling mud, which is forced ahead of the aqueous hydraulic cement slurry into the formation to split the same and enlarge the fractures or cracks to be filled, because if ordinary hydraulic cement aqueous slurry were employed it would lose water to the formation or foundation so rapidly that the cement slurry would start to set before much penetration has been effected. When a relatively low water-loss hydraulic cement aqueous slurry is employed, the amount of breakdown agent can be greatly reduced, or entirely eliminated, because the low water-loss cement slurry will penetrate to much greater distances before losing sufficient water to be caused to set by this dehydration. When squeeze cementing in oil wells is involved, in which it is desired to force a thin disk or layer of these cement slurries out into a natural earth formation along pre-existing or pressure made fractures, in order to separate an oil sand from some other sand at the general vicinity where the oil well intersects the same, it is especially advantageous to use a relatively low water-loss cement slurry as breakdown agent because then less water is likely to be absorbed by the oil formation where it might cause a reduction in the present or future amount of production of oil. Some oil-bearing formations contain bentonitic materials which swell when they encounter water, and if excess water is injected into such formations, the swelling of the bentonitic material may prevent future production of oil.

It is not believed necessary to have a drawing, or to describe minutely the well known cementing operations disclosed in such patents as U.S. 2,795,507 and 2,795,508.

By hydraulic cement this invention intends to include all mixtures of lime, silica, and alumina, or of lime and magnesia, silica and alumina and iron oxide (magnesia for example may replace part of the lime, and iron oxide a part of the alumina), as are commonly known as hydraulic cements. Hydraulic cements include hydraulic limes, grappier cements, puzzolan cements, natural cements and Portland cements. Puzzolan cements include slag cements made from slaked lime and granulated blast furnace slag. Because of its superior strength Portland cement is preferred among the hydraulic cements, but as the art of cements recognizes hydraulic cements as a definite class, and as results of value may be obtained with said additive with any member of that class, it is desired to claim all hydraulic cements. In addition to the ordinary construction grades of Portland cements or other hydraulic cements, modified hydraulic cements and Portland cements designated as high-early strength cement, heat resistant cement, and slow-setting cement may be used in the present invention.

In most oil well cementing and grouting operations it is generally desirable to use neat cement for added strength, but obviously it is always possible to add to the hydraulic cement, water, and said additive any desired amount of an inert granular filling material or aggregate such as sand, ground limestone, or any of the other well known inert or even cementitious aggregates, as long as simple tests show the amount added does not reduce the compressive strength after final set below the desired value. For example, in plugging porous formations, bentonite or other clays are often added to hydraulic cement aqueous slurries, as taught by U.S. Patent 2,041,086 of May 19, 1936, or iron oxide of barium sulfate is added to make heavy cement. Any of these aggregates can be added to the aqueous hydraulic cement slurry of the present invention in the usual proportion used in the prior art.

In operations in previously uncased wells it is often desirable to use neat cement in the practice of the present invention, because inert filling material may automatically become detached from the walls of the well, and will tend to mix with and dilute the slurry to such an extent that it is undesirable to add any filling material to the slurry being forced into the well. It is customary in the prior art when cementing to make simple tests as to time of set, compressive strength, etc., on samples of the proposed mix.

The amount of water added to the cement of the present invention is not critical, it being obvious that sufficient water should be added to form a pumpable slurry, and that when the slurry becomes pumpable no further water needed be added. One advantage of the slurry of the present invention when a relatively less degenerated acid cellulose sulfate or salt of the same is used it that it is a low water-loss slurry, and therefore it is not necessary to add much excess water over the amount making the slurry pumpable as a reserve for expected losses, which excess water might tend to reduce the final compressive strength of the cement.

It has been found that all hydraulic cements, especially Portland and Portland-type cement aqueous slurries can be retarded in setting time, the time of thickening extended, and in some cases the water-loss tendencies retarded, so that they meet all the above requirements for the satisfactory cementing of deep wells and like operations by the addition of a minor but effective amount of from 0.05 to 5 percent by weight of dry hydraulic cement of a mixture of from zero percent to 75 percent by weight of cellulose sulfate selected from the group consisting of acid cellulose sulfate and its salts, the remainder being selected from the group consisting of acid carboxymethyl hydroxyethyl cellulose mixed ether and its salts, the salts being those of any metal, ammonium or organic base, or other salts, without seriously affecting the other desirable properties of the cement. It is preferred at present to use the sodium or potassium salts of the acid cellulose sulfate, and to use the acid carboxymethyl hydroxyethyl cellulose mixed ether, merely because these materials are readily available commercially and therefore are relatively inexpensive. However, good results are obtained using the acid form of either, or both, the cellulose sulfate and the carboxymethyl hydroxyethyl cellulose mixed ether, or any alkali metal salt, such as the sodium, potassium, lithium, rubidium, caesium and other rare alkali metal salts, the other metal salts, such as the heavy metal salts, or the ammonium or organic base salts, all of which are water-soluble.

Typical organic base salts that can be used are those derived from ammonia such as methyl amine, dimethyl amine and quaternary ammonium bases; also pyridine, morpholine and the like. In addition the alkaline earth metal salts such as the barium, calcium, strontium and magnesium, and the heavy metal salts such as the aluminum, iron, copper, lead, silver, mercury, nickel, and all other salts (which are probably insoluble in water but which hydrolyze in the hydraulic cement aqueous slurry which is an aqueous alkaline solution) are just as useful in this invention in the aqueous hydraulic cement slurry which is quite alkaline. Said additive, whether it is composed of salts formed in the aqueous hydraulic cement slurry by hydrolysis of some water-insoluble salt, is valuable in amounts of 5 percent or less, based on the weight of the dry cement, in retarding the set of aqueous hydraulic cement slurry, especially at the temperature and pressure encountered in cementing a well, and in many instances said additive will decrease the water loss from said aqueous hydraulic cement slurry to porous formations encountered in the well.

While 0.05 percent to 5 percent of said additive by weight of the dry hydraulic cement will give valuable results, it has been found that from 0.2 to 1 percent is the most preferred range in wells less than 14,000 feet deep and less than 300° F., the use of 0.5 percent being particularly effective in such wells, and the percentage above 1 percent being chiefly of value in still deeper and hotter wells.

The term cellulose acid sulfate and its salts includes all cellulose compounds which may be regarded structurally as being the cellulose monoesters of sulfuric acid and the metal, ammonium or other salts thereof. The cellulose acid sulfate esters are characterized by the typical sulfate linkage:

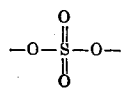

wherein S is sulfur, and O is oxygen.

It will be seen that the reaction product of cellulose and sulfuric acid or chlorosulfonic acid contains the sulfate linkage:

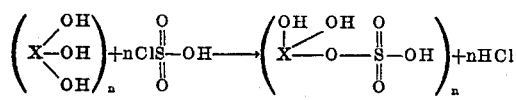

wherein

is an anhydroglucose unit of the cellulose molecule and $n$ is the number of such units in such cellulose molecule, the formula showing mono-substitution in each unit, whereas in actual practice some units have double or triple substitution and many units have no substitution at all, the degree of substitution merely being an average value.

Cellulose acid sulfate and its salts may be prepared by a number of sulfating methods old in the prior art, employing either sulfur trioxide gas and the cellulose alone, or sulfuric acid and/or sulfur trioxide along with various diluents to retard the reaction making it a sulfation reaction with the cellulose, and preventing oxidation; and no matter how the acid cellulose sulfate is made, it and any of its salts will act to retard the set of a hydraulic cement aqueous slurry and to increase the time before the cement thickens to the point where it is not pumpable. While not to be considered as limits, a relatively high degree of sulfate substitution for the present invention is about 0.2 or more out of the 3.0 possible in each anhydroglucose unit in the cellulose molecule (which unit has 3 hydroxyl groups which can be substituted), 0.2 being an average, as in an individual anhydroglucose unit the degree of substitution must always be an integer (1, 2 or 3) or zero. While it is preferred to use an average of between 0.2 and 3 sulfate radicals per anhydroglucose unit, valuable results are obtained outside of this range, especially if the cellulose sulfate is water-soluble or will hydrolyze to give water-soluble salts.

The acid cellulose sulfate or salts thereof may be prepared by any one of several methods as described above, but some of the preferred methods are those set forth in the Belgian Patent 448,249 of June 30, 1943, of G. Frank and his U.S. Patent 2,559,914 of July 10, 1951, and U.S. Patent 2,539,541 of January 30, 1951, of G. Malm. Another preferred method is the reaction of cellulose with a complex of sulfur trioxide, for example, pyridine-sulfur trioxide, in the presence of a tertiary amine, such as pyridine, and an inert diluent to form the desired product. The specific details of the process described in the last sentence are outlined in a prior copending application Serial No. 133,467 of R. V. Jones filed December 16, 1949 (now Patent 2,697,093), in which said process of preparing acid cellulose sulfate and its salts is claimed. The acid cellulose sulfate may also be prepared by the reaction of cellulose with an alkali metal chloro-sulfonate under anhydrous conditions, and in the presence of an inert diluent such as benzene, and a tertiary amine. The specific details of this process are outlined in a prior copending application Serial No. 105,452 filed July 18, 1949, of R. V. Jones (now Patent 2,686,779), in which this process of producing acid cellulose sulfate and its salts is claimed. Still other methods of preparing acid cellulose sulfate and salts of the same include the reaction of cellulose with chlorosulfonic acid in the presence of an inert diluent and tertiary amine.

Acid carboxymethyl hydroxyethyl cellulose mixed ether may be made from cellulose by reacting to form the carboxymethyl portion first and then the hydroxyethyl portion, or vice versa, or both at once. Reacting ethylene oxide with alkali cellulose is the commercial way to make hydroxyethylcellulose, see page 422 of the book "Cellulose Chemistry" by Heuser (1946) (John Wiley & Sons, Inc., New York). The reaction is that of addition and is formulated as:

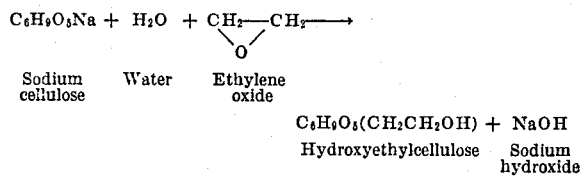

Other methods are mentioned on page 423 of said book. $C_6H_{10}O_5$ is one anhydroglucose unit of which there are many in each cellulose molecule.

On pages 421 and 422 of said book the preparation of carboxymethylcellulose (also known as glycolic acid ether of cellulose) is disclosed. It is formulated as:

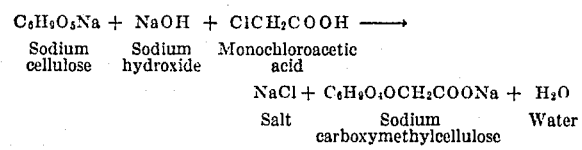

By reacting some of the cellulose hydroxyl groups in a sodium cellulose molecule with ethylene oxide and some with sodium hydroxide and monochloroacetic acid, sodium carboxymethyl hydroxyethyl cellulose mixed ether is formed. This may be converted to acid carboxymethyl hydroxyethyl cellulose mixed ether by reaction with an acid such as nitric acid and removal of the resulting sodium nitrate or other salt by purification, if purification is desired. When used in cement in the present invention, such purification is not always necessary. The substitution of both types of radicals need not be on the same anhydroglucose unit of the molecule; sometimes it is, and sometimes not. Nor is it necessary that all anhydroglucose units be reacted with either, as those units in the molecule that are so reacted will make the molecule active as a cement additive. It is preferred to have a combined substitution of carboxymethyl and hydroxyethyl radicals per anhydroglucose unit averaging from 0.2 to 2.2 in which the carboxymethyl radicals average from 0.15 to 2.15 and the hydroxyethyl radicals average from 0.05 to 2.05 but valuable results are still obtained outside of this range, especially if the mixed ether is water-soluble, or will hydrolyze to give water-soluble salts.

Portland cement is a mixture of complex silicates and aluminates of calcium containing excess lime. The setting or hardening is a result of the hydration or other chemical readjustments of the various components. Generally speaking, three periods in the set are recognized: "initial," "final" and "hardening" sets. The initial set normally occurs at ordinary temperatures in from one to two hours after the mixing, the final set two to five hours later and the hardening continues for an indefinite time but it is substantially complete in about 30 days.

The initial set is said to have occurred when a cement slurry has lost its plasticity to such a degree that the two pieces of a broken specimen will not unite to form a homogeneous mass when placed in close contact. The individual grains of a cement slurry must remain undisturbed in intimate contact with each other for a time before the initial set occurs in order to produce a coherent mass. Agitation during the latter part of the period of initial set will prevent the cement from hardening properly to the desired homogeneous, coherent mass.

In order to form a perfect seal in cementing wells, it is necessary that the cement be placed before the initial set occurs and it is desirable that it be placed and allowed to stand for a short period before the initial set begins. With the equipment available, there is a limit to the time in which it is possible to mix a cement and pump it into the bottom of the well and up around the casing to the location desired.

Another reason it is necessary to have the cement in place before the initial set begins is that the viscosity rises as the setting progresses. This increases the difficulty of pumping and is undesirable because of the added strain on the pumping equipment.

It is possible to retard the rate of set, within narrow limits, by increasing the alumina content of the cement, but this method is not widely used because of the high cost of high alumina cements and the limited effective range. The rate of set can be retarded also by increasing the amount of water present in the mix. However, above about 35 to 50 percent water, based on the weight of dry cement, increased amounts of water will result in weaker cement and there is no way of knowing exactly how much dilution will result from water encountered in the well. Addition of small amounts of gypsum or calcium sulfate will result in the retarded rate of set, but an excess will increase the rate and may cause the cement to disintegrate or be weakened. It is, therefore, highly desirable that a retarded cement such as mine be available for cementing work.

The most convenient method of using said additive in cement is to run the same and the hydraulic cement through a rotary mixer to produce intimate mixing and later add water to form a fluid slurry. However, said additive may be added directly to the cement and water at the time of mixing at the well, or said additive may be dissolved in the water with which the cement is mixed, with substantially the same result. The method of mixing is not critical as long as a somewhat uniform mixture is produced.

The rate of hydration or set of cement is ordinarily increased by an increase in temperature. Since the bottom hole temperature in the well may be considerably higher than the atmospheric temperature, it is desirable that a method such as I have described be available for use in the cementing of oil wells. My method is effective at elevated temperatures as well as at ordinary atmospheric temperatures, because obviously a set retarding agent operative at atmospheric temperatures will also retard the set at higher temperatures.

While it is not desired to limit the present invention by any theory of operation and while the scope and validity of the claims do not depend upon the validity of any theory of operation, it is believed helpful in understanding the invention to think of said additive temporarily absorbing so much of the water that the Portland cement is only slowly able to obtain enough water to make its initial set, whereby the initial set of the cement is greatly retarded. Finally the Portland cement particles take the water away from said additive and attain an initial and then a final set with suitable strength in the cement for use in oil well cementing operations.

An aqueous slurry of 40 percent water by weight of the dry cement was made with Portland cement. This slurry was subdivided into a portion for each of the following experiments. Said additive was added in the proportions and amounts indicated to all but the first experiment which acted as a comparison, and the results were recorded in Table I below. The Halliburton thickening time in hours at 180° F., and the initial water-loss and water-loss after 1, 2, and 3 hours (in some cases) at 180° F., of these tests is recorded.

*Table I*

| Run No. | Additives [1] | | | Thickening Time, (hours) | Water-Loss, Milliliters/Minutes | | | |
|---|---|---|---|---|---|---|---|---|
| | Cel.SO₄, Percent | CMHEC, Percent | Total, Percent | | Initial | 1 hr. | 2 hrs. | 3 hrs. |
| 1 | 0 | 0 | 0 | 0.9 | 20/0.2 | Set [2] | | |
| 2 | 0.7 | 0 | 0.7 | 36.8 | 7/30 | 7/30 | 6.5/30 | |
| 3 | 0.35 | 0.35 | 0.7 | 58.8 | 6/30 | 7.5/30 | 6.5/30 | 7.5/30 |
| 4 | 0 | 0.7 | 0.7 | 49.3 | 6.5/30 | 9/30 | 22/27 | 32/22 |
| 5 | 0.5 | 0 | 0.5 | 7.3 | 8.5/30 | | | |
| 6 | 0.375 | 0.125 | 0.5 | 40.1 | 9.5/30 | | | |
| 7 | 0.25 | 0.25 | 0.5 | 37.2 | 10.5/30 | | | |
| 8 | 0.125 | 0.375 | 0.5 | 24.8 | 12.5/30 | | | |
| 9 | 0 | 0.5 | 0.5 | 22.3 | 8.5/30 | | | |

[1] The abbreviations Cel.SO₄ and CMHEC used in Table I refer respectively to sodium cellulose sulfate and the acid carboxymethyl hydroxyethyl cellulose mixed ether, although as pointed out, any other salt than sodium, or the free acid thereof would give equivalent results because the cement hydrolyzes the same. The percentage is by weight of the dry Portland cement, which could be any other hydraulic cement with similar results except for compressive strength which is highest with Portland cement.
[2] Obviously, after it set there was no water loss.

It will be noted in Table I that the water loss reduction and increase in thickening time is greatest for the 50 percent cellulose sulfate, 50 percent carboxymethyl hydroxyethyl cellulose mixed ether, total 0.7 percent mixture, of run No. 3. However, it should also be noted that run No. 4 with 0.7 percent carboxymethyl hydroxyethyl cellulose mixed ether alone is better both as to decrease in water-loss and increase in thickening time than run No. 2 with 0.7 percent of cellulose sulfate only. From this it appears obvious that mixtures of the two materials containing 0 to 25 percent cellulose sulfate are of great value, although not quite as effective as with 25 to 75 percent cellulose sulfate.

The retarded set, or extended thickening time, was best measured by the Halliburton "thickening time" by which is meant the time at which the setting cement slurry reaches a calibrated 100 poises of viscosity, which viscosity is approaching about the limit in increasing viscosity that is readily handled by pumps through some thousands of feet of casing and well bore outside the casing in a well.

Baroid filter presses operated at 100 pounds per square inch were used to determine the water-losses of cement slurries.

Thickening times of cement slurries were measured at atmospheric pressure with a Halliburton consistometer.

The water-losses of the cement slurries were determined by the procedure specified for use on drilling fluids by API Code 29 (1942). The treatment of the cement slurry preceding the water-loss determination consisted of mixing the water and cement for three minutes to form the slurry and then storing the slurry in sealed jars in an oven at 180° F.

Thickening times of cement slurries were measured at atmospheric pressure in a Halliburton consistometer according to the procedure described in API Code 32, section XII, paragraphs 54 and 67 (1947). Throughout this report "thickening time" refers to a Halliburton consistometer (atmospheric pressure) thickening time unless otherwise specified.

While numerous examples of the invention have been given for purposes of illustration, the invention is not limited thereto.

Having described my invention, I claim:

1. A hydraulic cement capable of forming a fluid slurry when mixed with water, said hydraulic cement having an extended thickening time, said hydraulic cement comprising a hydraulic cement mixed with a minor proportion by weight of the dry cement of a hydraulic cement thickening time extending agent consisting of from 25 percent to 75 percent by weight of cellulose sulfate selected from the group consisting of acid cellulose sulfate and its salts, the remainder being selected from the group consisting of acid carboxymethyl hydroxyethyl cellulose mixed ether and its salts.

2. The process of producing a Portland cement aqueous slurry having an extended thickening time which comprises admixing with Portland cement a minor proportion by weight of the dry cement effective to reduce said water-loss of said slurry of an additive consisting of from 25 percent to 75 percent by weight of alkali metal cellulose sulfate, the remainder being acid carboxymethyl hydroxyethyl cellulose mixed ether and mixing therewith sufficient water to produce a fluid slurry.

3. A hydraulic cement capable of forming a fluid slurry when mixed with water, said hydraulic cement having an extended thickening time, said hydraulic cement comprising a hydraulic cement mixed with 0.05 percent to 5 percent by weight of the dry cement of a hydraulic cement thickening time extending agent consisting of from 25 percent to 75 percent by weight of cellulose sulfate selected from the group consisting of acid cellulose sulfate and its salts, the remainder being selected from the group consisting of acid carboxymethyl hydroxyethyl cellulose mixed ether and its salts.

4. A hydraulic cement slurry having a retarded setting time at temperatures above atmospheric, comprising a hydraulic cement, water and a minor proportion by weight of the dry cement of a hydraulic cement thickening time extending agent consisting of from 25 percent to 75 percent by weight of cellulose sulfate selected from the group consisting of acid cellulose sulfate and its salts, the remainder being selected from the group consisting of acid carboxymethyl hydroxyethyl cellulose mixed ether and its salts.

5. A hydraulic cement slurry having a retarded setting time at temperatures above atmospheric, comprising Portland cement, water and a minor proportion by weight of the dry cement of an additive consisting of from 25 percent to 75 percent by weight of sodium cellulose sulfate, the remainder being acid carboxymethyl hydroxyethyl cellulose mixed ether.

6. A hydraulic cement capable of forming a fluid slurry when mixed with water, said hydraulic cement comprising a hydraulic cement mixed with from 0.05 percent to 5 percent by weight of the dry cement of an additive consisting of from 25 percent to 75 percent by weight of alkali metal cellulose sulfate, the remainder being acid carboxymethyl hydroxyethyl cellulose mixed ether.

7. A hydraulic cement capable of forming a fluid slurry when mixed with water, said hydraulic cement comprising Portland cement mixed with a minor proportion by weight of the dry cement of an additive consisting of from 25 percent to 75 percent by weight of sodium cellulose sulfate, the remainder being acid carboxymethyl hydroxyethyl cellulose mixed ether.

8. A hydraulic cement slurry comprising a hydraulic cement, water, and a minor proportion by weight of the dry cement of an additive consisting of from 25 percent to 75 percent by weight of alkali metal cellulose sulfate, the remainder being acid carboxymethyl hydroxyethyl cellulose mixed ether.

9. A hydraulic cement slurry comprising Portland cement, water, and from 0.05 percent to 5 percent by weight of the dry cement of an additive consisting of from 25 percent to 75 percent by weight of alkali metal cellulose sulfate, the remainder being acid carboxymethyl hydroxyethyl cellulose mixed ether.

10. In the method of cementing a casing in a well which comprises pumping down through the casing and into the annular space between the casing and the borehole an aqueous hydraulic cement slurry, the step of adding to the cement slurry a minor amount by weight of the dry cement of a hydraulic cement thickening time extending agent consisting of from 25 percent to 75 percent by weight of cellulose sulfate selected from the group consisting of acid cellulose sulfate and its salts, the remainder being selected from the group consisting of acid carboxymethyl hydroxyethyl cellulose mixed ether and its salts.

11. In the method of cementing a casing in a well which comprises pumping down through the casing and into the annular space between the casing and the borehole an aqueous hydraulic cement slurry, the step of adding to the cement slurry an agent consisting of from 25 percent to 75 percent by weight of cellulose sulfate selected from the group consisting of acid cellulose sulfate and its salts, the remainder being selected from the group consisting of acid carboxymethyl hydroxyethyl cellulose mixed ether and its salts in amounts ranging between 0.2 percent and 1 percent by weight of the dry cement in the slurry.

12. In the method of cementing a casing in a well which comprises pumping down through the casing and into the annular space between the casing and the borehole an aqueous Portland cement slurry, the step of adding to the cement slurry a minor but effective amount by weight of the dry cement of an additive consisting of from 25 percent to 75 percent by weight of sodium cellulose sulfate, the remainder being acid carboxymethyl hydroxyethyl cellulose mixed ether sufficient to extend the thickening time of said slurry.

13. In the method of cementing a casing in a well which comprises pumping down through the casing and into the annular space between the casing and the borehole an aqueous Portland cement slurry, the step of adding to the cement slurry a minor but effective amount by weight of the dry cement of an additive consisting of from 25 percent to 75 percent by weight of alkali metal cellulose sulfate, the remainder being acid carboxymethyl hydroxyethyl cellulose mixed ether sufficient to extend the thickening time of said slurry.

14. The process of cementing a hole which extends into a formation which comprises placing a hydraulic cement aqueous slurry having an extended thickening time adjacent to said formation by admixing with hydraulic cement from 0.05 percent to 5 percent by weight of the dry cement of an additive consisting of from 25 percent to 75 percent by weight of alkali metal cellulose sulfate, the remainder being acid carboxymethyl hydroxyethyl cellulose mixed ether, mixing therewith sufficient water to produce a fluid slurry and introducing said slurry into said hole into contact with said formation.

15. The process of producing a hydraulic cement aqueous slurry having an extended time of set which comprises admixing with hydraulic cement from 0.05 percent to 5 percent by weight of the dry cement of a hydraulic cement thickening time extending agent consisting of from 25 percent to 75 percent by weight of cellulose sulfate selected from the group consisting of acid cellulose sulfate and its salts, the remainder being selected from the group consisting of acid carboxymethyl hydroxyethyl cellulose mixed ether and its salts, and mixing therewith sufficient water to produce a fluid slurry.

16. The process of producing a Portland cement aqueous slurry having an extended thickening time which comprises admixing with Portland cement a minor proportion by weight of the dry cement effective to reduce said water-loss of said slurry of an additive consisting of from 25 percent to 75 percent by weight of sodium cellulose sulfate, the remainder being acid carboxymethyl hydroxyethyl cellulose mixed ether and mixing therewith sufficient water to produce a fluid slurry.

17. The process of cementing a hole which extends into a formation which comprises placing a hydraulic cement aqueous slurry having an extended thickening time adjacent to said formation by admixing with hydraulic cement from 0.05 percent to 5 percent by weight of the dry cement of an additive consisting of from 25 percent to 75 percent by weight of sodium cellulose sulfate, the remainder being acid carboxymethyl hydroxyethyl cellulose mixed ether, mixing therewith sufficient water to produce a fluid slurry and introducing said slurry into said hole into contact with said formation.

18. The process of cementing a well which extends into a porous formation which comprises placing a Portland cement aqueous slurry having a reduced water-loss adjacent to said porous formation by admixing with Portland cement a minor proportion by weight of the dry cement effective to reduce the water-loss of said slurry of a Portland cement thickening time extending agent consisting of from 25 percent to 75 percent by weight of cellulose sulfate selected from the group consisting of acid cellulose sulfate and its salts, the remainder being selected from the group consisting of acid carboxymethyl hydroxyethyl cellulose mixed ether and its salts, mixing therewith sufficient water to produce a fluid slurry and introducing said slurry into said well into contact with said porous formation.

19. A cement composition consisting essentially of a major portion of a dry hydraulic cement mixed with 0.05 to 5 percent of its weight of a cement thickening time extending and water loss reducing agent selected from the group consisting of acid carboxymethyl hydroxyethyl cellulose mixed ether and its salts, in which the total substitution per anhydroglucose unit of the cellulose of carboxyalkyl and hydroxyethyl groups is between 0.2 to 2.2, the hydroxyethyl substitution is between 0.05 to 2.05, and the carboxyalkyl substitution is between 0.15 to 2.15.

20. The composition of claim 19 in which the hydraulic cement is Portland cement.

21. A cement composition aqueous slurry consisting essentially of a major portion of a dry hydraulic cement mixed with 0.05 to 5 percent of its weight of a cement thickening time extending and water loss reducing agent selected from the group consisting of acid carboxymethyl hydroxyethyl cellulose mixed ether and its salts, in which the total substitution per anhydroglucose unit of the cellulose of carboxyalkyl and hydroxyethyl groups is between 0.2 to 2.2, the hydroxyethyl substitution is between 0.05 to 2.05, and the carboxyalkyl substitution is between 0.15 to 2.15, and sufficient water to produce a pumpable slurry.

22. The composition of claim 21 in which the hydraulic cement is Portland cement.

23. In the method of cementing a casing in a well which comprises pumping a cement composition aqueous slurry comprising hydraulic cement into the annular space between the casing and the borehole, the step of adding to the slurry 0.05 to 5 weight percent of the dry weight of the hydraulic cement in said slurry of a cement thickening time extending and water loss reducing agent selected from the group consisting of acid carboxymethyl hydroxyethyl cellulose mixed ether and its salts, in which the total substitution per anhydroglucose unit of the cellulose of carboxyalkyl and hydroxyethyl groups is between 0.2 to 2.2, the hydroxyethyl substitution is between 0.05 to 2.05, and the carboxyalkyl substitution is between 0.15 to 2.15.

24. A hydraulic cement slurry composition comprising a dry hydraulic cement, sufficient water to produce a pumpable slurry, and 0.05 to 5 percent of the weight of said dry hydraulic cement of a cement thickening time and water loss reducing agent consisting of from zero to 75 percent by weight of cellulose sulfate selected from the group consisting of acid cellulose sulfate and its salts, the remainder being selected from the group consisting of acid carboxymethyl hydroxyethyl cellulose mixed ether and its salts, in which the total substitution per anhydroglucose unit of the cellulose of carboxyalkyl and hydroxyethyl groups is between 0.2 to 2.2, the hydroxyethyl substitution is between 0.05 to 2.05, and the carboxyalkyl substitution is between 0.15 to 2.15.

25. The composition of claim 24 in which the hydraulic cement is Portland cement.

26. A hydraulic cement composition comprising a major portion of a dry cement, and 0.05 to 5 percent of the weight of said dry hydraulic cement of a cement thickening time and water loss reducing agent consisting of from zero to 75 percent by weight of cellulose sulfate selected from the group consisting of acid cellulose sulfate and its salts, the remainder being selected from the group consisting of acid carboxymethyl hydroxyethyl cellulose mixed ether and its salts, in which the total substitution per anhydroglucose unit of the cellulose of carboxyalkyl and hydroxyethyl groups is between 0.2 to 2.2, the hydroxyethyl substitution is between 0.05 to 2.05, and the carboxyalkyl substitution is between 0.15 to 2.15.

27. The composition of claim 26 in which the hydraulic cement is Portland cement.

28. A cement composition consisting essentially of a major portion of a dry hydraulic cement mixed with 0.05 to 0.7 percent of its weight of a cement thickening time extending and water loss reducing agent selected from the group consisting of acid carboxymethy hydroxyethyl cellulose mixed ether and its salts, in which the total substitution per anhydroglucose unit of the cellulose of carboxyalkyl and hydroxyethyl groups is between 0.2 to 2.2, the hydroxyethyl substitution is between 0.05 to 2.05, and the carboxyalkyl substitution is between 0.15 to 2.15.

29. The composition of claim 28 in which the hydraulic cement is Portland cement.

30. A cement composition aqueous slurry consisting essentially of a major portion of a dry hydraulic cement mixed with 0.05 to 0.7 percent of its weight of a cement thickening time extending and water loss reducing agent selected from the group consisting of acid carboxymethyl hydroxyethyl cellulose mixed ether and its salts, in which the total substitution per anhydroglucose unit of the cellulose of carboxyalkyl and hydroxyethyl groups is between 0.2 to 2.2, the hydroxyethyl substitution is between 0.05 to 2.05, and the carboxyalkyl substitution is between 0.15 to 2.15, and sufficient water to produce a pumpable slurry.

31. The composition of claim 30 in which the hydraulic cement is Portland cement.

32. In the method of cementing a casing in a well which comprises pumping a cement composition aqueous slurry comprising hydraulic cement into the annular space between the casing and the borehole, the step of adding to the slurry 0.05 to 0.7 weight percent of the dry weight of the hydraulic cement in said slurry of a cement thickening time extending and water loss reducing agent selected from the group consisting of acid carboxymethyl hydroxyethyl cellulose mixed ether and its salts, in which the total substitution per anhydroglucose unit of the cellulose of carboxyalkyl and hydroxyethyl groups is between 0.2 to 2.2, the hydroxyethyl substitution is between 0.05 to 2.05, and the carboxyalkyl substitution is between 0.15 to 2.15.

33. A hydraulic cement slurry composition comprising a dry hydraulic cement, sufficient water to produce a pumpable slurry, and 0.05 to 0.7 percent of the weight of said dry hydraulic cement of a cement thickening time and water loss reducing agent consisting of from zero to 75 percent by weight of cellulose sulfate selected from the group consisting of acid cellulose sulfate and its salts, the remainder being selected from the group consisting of acid carboxymethyl hydroxyethyl cellulose mixed ether and its salts, in which the total substitution per anhydroglucose unit of the cellulose of carboxyalkyl and hydroxyethyl groups is between 0.2 to 2.2, the hydroxyethyl substitution is between 0.05 to 2.05, and the carboxyalkyl substitution is between 0.15 to 2.15.

34. The composition of claim 33 in which the hydraulic cement is Portland cement.

35. A hydraulic cement composition comprising a major portion of a dry cement, and 0.05 to 0.7 percent of the weight of said dry hydraulic cement of a cement thickening time and water loss reducing agent consisting of from zero to 75 percent by weight of cellulose sulfate selected from the group consisting of acid cellulose sulfate and its salts, the remainder being selected from the group consisting of acid carboxymethyl hydroxyethyl cellulose mixed ether and its salts, in which the total substitution per anhydroglucose unit of the cellulose of carboxyalkyl and hydroxyethyl groups is between 0.2 to 2.2, the hydroxyethyl substitution is between 0.05 to 2.05, and the carboxyalkyl substitution is between 0.15 to 2.15.

36. The composition of claim 35 in which the hydraulic cement is Portland cement.

37. A cement composition consisting essentially of a major portion of a dry hydraulic cement mixed with a small percentage of its weight sufficient to extend the cement thickening time and reduce the water loss of aqueous slurries of said cement of an agent selected from the group consisting of acid carboxymethyl hydroxyethyl cellulose mixed ether and its salts, in which the total substitution per anhydroglucose unit of the cellulose of carboxyalkyl and hydroxyethyl groups is between 0.2 to 2.2, the hydroxyethyl substitution is between 0.05 to 2.05, and the carboxyalkyl substitution is between 0.15 to 2.15.

38. The composition of claim 37 in which the hydraulic cement is Portland cement.

39. A cement composition aqueous slurry consisting essentially of a major portion of a dry hydraulic cement mixed with a small percentage of its weight sufficient to extend the cement thickening time and reduce the water loss of aqueous slurries of said cement of an agent selected from the group consisting of acid carboxymethyl hydroxyethyl cellulose mixed ether and its salts, in which the total substitution per anhydroglucose unit of the cellulose of carboxyalkyl and hydroxyethyl groups is between 0.2 to 2.2, the hydroxyethyl substitution is between 0.05 to 2.05, and the carboxyalkyl substitution is between 0.15 to 2.15, and sufficient water to produce a pumpable slurry.

40. The composition of claim 39 in which the hydraulic cement is Portland cement.

41. In the method of cementing a casing in a well which comprises pumping a cement composition aqueous slurry comprising hydraulic cement into the annular space between the casing and the borehole, the step of adding to the slurry a small percentage of the dry weight of said hydraulic cement sufficient to extend the cement thickening time and reduce the water loss of said aqueous slurry of an agent selected from the group consisting of acid carboxymethyl hydroxyethyl cellulose mixed ether and its salts, in which the total substitution per anhydroglucose unit of the cellulose of carboxyalkyl and hydroxyethyl groups is between 0.2 to 2.2, the hydroxyethyl substitution is between 0.05 to 2.05, and the carboxyalkyl substitution is between 0.15 to 2.15.

42. A hydraulic cement slurry composition comprising a dry hydraulic cement, sufficient water to produce a pumpable slurry, and a small percentage of the dry weight of said hydraulic cement sufficient to extend the cement thickening time and reduce the water loss of said slurry of an agent consisting of from zero to 75 percent by weight of cellulose sulfate selected from the group consisting of acid cellulose sulfate and its salts, the remainder being selected from the group consisting of acid carboxymethyl hydroxyethyl cellulose mixed ether and its salts, in which the total substitution per anhydroglucose unit of the cellulose of carboxyalkyl and hydroxyethyl groups is between 0.2 to 2.2, the hydroxyethyl substitution is between 0.05 to 2.05, and the carboxyalkyl substitution is between 0.15 to 2.15.

43. The composition of claim 42 in which the hydraulic cement is Portland cement.

44. A hydraulic cement composition comprising a major portion of a dry cement, and a small percentage of the weight of said dry cement sufficient to extend the cement thickening time and reduce the water loss of aqueous slurries of said cement of an agent consisting of from zero to 75 percent by weight of cellulose sulfate selected from the group consisting of acid cellulose sulfate and its salts, the remainder being selected from the group consisting of acid carboxymethyl hydroxyethyl cellulose mixed ether and its salts, in which the total substitution per anhydroglucose unit of the cellulose of carboxyalkyl and hydroxyethyl groups is between 0.2 to 2.2, the hydroxyethyl substitution is between 0.05 to 2.05, and the carboxyalkyl substitution is between 0.15 to 2.15.

45. The composition of claim 44 in which the hydraulic cement is Portland cement.

References Cited in the file of this patent

UNITED STATES PATENTS

| | | |
|---|---|---|
| Re. 23,873 | Ludwig | Sept. 21, 1954 |
| 2,042,484 | Rubenstein | June 2, 1936 |
| 2,427,683 | Ludwig | Sept. 23, 1947 |
| 2,471,632 | Ludwig | May 31, 1949 |
| 2,514,021 | Abraham | July 4, 1950 |
| 2,539,451 | Malm et al. | Jan. 30, 1951 |
| 2,560,611 | Wagner | July 17, 1951 |
| 2,618,595 | Gloor | Nov. 18, 1952 |
| 2,629,667 | Kaveler | Feb. 24, 1953 |